United States Patent [19]

Moffett et al.

[11] Patent Number: 5,371,049
[45] Date of Patent: Dec. 6, 1994

[54] CERAMIC COMPOSITE OF SILICON CARBIDE AND ALUMINUM NITRIDE

[75] Inventors: Keith R. Moffett; John D. Morrow, both of San Jose, Calif.

[73] Assignee: FMC Corporation, Chicago, Ill.

[21] Appl. No.: 294,458

[22] Filed: Jan. 9, 1989

[51] Int. Cl.$^5$ .......................... C09B 35/52; B22F 3/00
[52] U.S. Cl. ..................... 501/89; 501/128; 419/13; 419/16; 419/25; 419/48
[58] Field of Search .............. 419/13, 16, 25, 48; 501/89, 128

[56] References Cited

U.S. PATENT DOCUMENTS

| | | | |
|---|---|---|---|
| 4,141,740 | 2/1979 | Cutler et al. | 106/44 |
| 4,332,755 | 6/1982 | Murata | 264/65 |
| 4,467,043 | 8/1984 | Kriegesmann et al. | 501/88 |
| 4,569,927 | 2/1986 | Suzuki | 501/89 |
| 4,681,861 | 7/1987 | Saito | 501/89 |
| 4,777,155 | 10/1988 | Baba et al. | 501/87 |
| 4,796,077 | 1/1989 | Takeda et al. | 357/67 |

OTHER PUBLICATIONS

European Patent App'n. Ser. No. 0,322,719, May 7, 1989.

An article appearing in Journal of Material Science (1981) entitled "Fabrication and Characterization of SiC-Aln Alloys" by William Rafaniello, Kurn Cho and Anil V. Virkar.

An article appearing in Journal of Material Science (1981) entitled "Fabrication, Thermal Treatment and Microstructure Development in SiC-AlN-Al$_2$OC Ceramics" by S. Y. Kuo, Z. C. Jou and A. V. Virkar.

A paper published by Department of Material Science and Engineering, University of Utah entitled "Investigation of Phase Stability in the System SiC-AlN" by William Rafaniello, Mark P. Plichta, and Anil V. Virkar.

An article appearing in Communications of American Ceramic Society, Mar. 1983 entitled "Effect of Hot-Pressing Temperature on the Thermal Diffusivity/Conductivity of SiC/AlN Composites" by Larry D. Bentsen and D. P. H. Hasselman.

An article appearing in Journal of Material Science Letters (1984) entitled "The Si$_3$Al$_4$N$_4$C$_3$ and Si$_3$Al$_5$N$_5$C$_3$ Compounds as SiC-AlN Solid Solutions" by Avigdor Zangvil and Robert Ruh.

An article entitled "New Materials in the Si-C-Al-O-N and Related Systems" by MacMillan Journals Ltd. 5 Oct., 1978.

An article entitled "Elevated-Temperature Creep of Silicone Carbide-Aluminum Nitride Ceramics: Role of Grain Size" by Jou, Kuo, and Virkar published by Communications of the American Ceramic Society—Nov. 1986.

*Primary Examiner*—Peter A. Nelson
*Attorney, Agent, or Firm*—M. B. Lee; R. C. Kamp; R. B. Megley

[57] ABSTRACT

A ceramic composite is disclosed which may be used as lightweight armor or for other impact or wear resisting purposes. The ceramic composite may comprise distinct phases of AlN and SiC; may be a solid solution of SiC; or may contain AlN or SiC, or both AlN and SiC as residual phase(s) in a solid solution matrix of SiC and AlN.

14 Claims, No Drawings

CERAMIC COMPOSITE OF SILICON CARBIDE AND ALUMINUM NITRIDE

BACKGROUND OF THE INVENTION

1. Field of the Invention

The present invention relates to the use of silicon carbide/aluminum nitride as a solid solution ceramic composite for use in armor, cutting tools, wear parts, nozzles, parts subject to high temperature, and similar articles subjected to severe impacts or abrasive action.

2. Description of the Prior Art

Cutler et al U.S. Pat. No. 4,141,740 discloses a refractory product formed as a solid solution from aluminum nitride, silicon carbide, and aluminum oxycarbide and the process for producing the refractory product. This patent is cited as background pertaining to the subject invention.

It is well known that silicon carbide ceramic faced armor systems are light weight and offer substantially better ballistics performance than that of monolithic metallic plates. The silicon carbide ceramic faced armor systems are better because the ceramics which are used have greater compressive mechanical properties, especially dynamic compressive yield strengths, than do the metals. These ceramics then cause the projectile to deform more than do the metals, either through plastic deformation and erosion, or through fracture. The penetration capabilities of the projectile is reduced by this increased deformation in two ways. Projectile plastic deformation and consequent erosion reduces the kinetic energy of a projectile through plastic flow and reduction in projectile mass. Alternately, a fractured projectile is essentially defocused; its impact footprint is increased which allows a large volume of the target material to work against the projectile.

While silicon carbide ceramic faced armor systems have performances which are known to be superior to most other systems, it is not presently used on light armored combat vehicles for two major reasons. The first is cost; the high performance silicon carbide ceramic materials now typically cost in the range of $50.00 to $100.00 per pound. Our Government is presently unwilling to pay the resulting high cost of an armor system utilizing these high cost ceramics for application to a light weight armored vehicle. The other reason is the typical poor multi-hit performance of silicon carbide ceramic systems caused by the highly brittle nature of the ceramic material. Silicon carbide ceramic faced armored systems are typically built with ceramic plates or "tiles". A ballistic impact on one tile is sufficient to fracture that tile such that it will not prevent a penetration if hit a second time. In addition, the impact into the first tile can often induce fracture of adjacent tiles, reducing their performance such that they will no longer prevent projectile penetration. Hence, the multi-hit performance, or number of projectiles that can be stopped at any given area is limited.

SUMMARY OF THE INVENTION

The ceramic composite materials of the present invention are primarily intended for use as a lightweight armor for deflecting armor piercing projectiles through erosion and shattering of the projectile. The composite material may be used for other uses where they would be subjected to severe wear, high temperatures, abrasive action or other severe impacts.

When used in lightweight armor, the ceramic composites are specifically formulated and processed for the best trade-off between both economy of manufacture and performance. More particularly, the composites are comprised of microstructures containing two or three phases which include: silicon carbide, (SiC), aluminum nitride (AlN), or a solid solution of AlN and SiC.

Through proper selection of powders and firing conditions, one of the following different microstructural types can be produced:

TYPE 1 comprises distinct phases of SiC and AlN;

TYPE 2 comprises a solid solution of SiC and AlN; and

TYPE 3 contains an AlN, or SiC, or both AlN and SiC as residual phase(s) in a solid solution matrix of SiC and AlN.

The firing may be either sintering or hot-pressing, and firing conditions of temperature and time are the controlling factors in obtaining the desired microstructure.

DESCRIPTION OF THE PREFERRED EMBODIMENT

Prior to describing the ceramic composite material of the present invention, it is believed that a brief description of the preferred use of the material as armor for preventing the penetration of high velocity steel, tungsten and similar piercing projectiles, would be helpful.

As indicated above, it is well known that excessively heavy armor added to military combat vehicles is undesirable since it lowers the performance of the vehicles. When using a ceramic composite of AlN and SiC it has been determined that the composite is not only much lighter in weight but is also lower in cost than steel silicon carbide when defeating the same ballistic threats. Also a ceramic composite of AlN and SiC when used as armor exhibits considerable toughness during ballistic impact which provides large granular fractures and chunks after impact. Toughness is also exhibited by the ceramic composite of the present invention since its ballistic performance is constant at all angles of obliquity, i.e., the same resistance to penetration occurs when the armor is impacted by a weapon when contacted at 90° or at an angle less than 90° to the surface of the armor. It is well known that other ceramic armor, such as boron carbide fractures differently with changes in obliquity.

It is also believed that chemical definitions of "solution", "phase" and "residual" may be helpful in understanding the invention.

"Solution" is defined as a "single homogeneous, liquid, solid or gas phase that is a mixture in which the components "liquids, gas, solid, or combinations thereof" are uniformly distributed throughout the mixture.

"Phase" is defined as "portions of a physical system (liquid, gas, solid) that is homogeneous throughout, has definable boundaries, and can be separated physically from other phases.

"Residual" relates to a mineral deposit formed by a chemical concentration of residue left in place.

When it is said that one system (A) offers better performance than another system (B); it means either that the minimum weight of a system (A) is less than that of (B) when both are designed to prevent penetration of a projectile under identical impact conditions, or that when both systems are of the same weight, system (A)

can prevent a given projectile from penetrating under more severe impact conditions than can system (B).

As mentioned previously, silicon carbide faced armor systems when used alone are too costly and lack multi-hit.

The ceramic composite of the present invention is formed from a mixture of powders of AlN and 1 to 99% SiC. It has been determined that just 1% of AlN is enough to modify the microstructure since the grain size of the composite is refined at 1% and above. It has also been determined that 75 to 95% of SiC yields the higher fracture toughness. The powders are blended followed by molding and sintering or by hot-pressing. The firing temperature is selected dependent upon the microstructure desired. For a TYPE 1 microstructure, a mixture of AlN and SiC, firing is conducted in the range of 1600 to 1800 degrees centigrade. For TYPE 2 or 3 microstructure, with a matrix of a solid solution of AlN and SiC, the firing temperature ranges from about 1800 to 2300 degrees centigrade. A significant fraction of the powders react at this higher temperature, to form a solid solution matrix, which densifies around the unreacted particles.

The above ceramic composites of the present invention is intended to address the problem of prior art silicon carbide ceramic armored systems discussed previously. AlN has been ballistically tested and found to have about two-thirds of the ballistic performance of SiC. However, the cost of AlN is projected to drop to near half of the price of SiC in the near term, due to a large market potential in electronic applications. The addition of AlN to SiC decreases final costs into two ways. First, the inclusion of the lower cost powder decreases the cost of the final product. Secondly, the inclusion of AlN allows for a significant reduction in the processing temperature compared to SiC without the AlN. TYPE 1 microstructure AlN/SiC composite parts, with 38 volume percent SiC, have been hot-pressed at 1650° C. compared to 1950° C. typically required without the AlN. This reduction in temperature significantly increases the life of the hot-pressing graphite tooling, resulting in reduced final part costs.

Regarding the multi-hit performance, AlN in ballistic tests has demonstrated higher toughness compared to plain SiC. This was demonstrated both by the very course rubble (compared to that of SiC) of AlN after ballistic impact, and by the constant performance of the AlN over a range of angles of attack of the projectiles. The ballistic performance of other high performance ceramics such as boron carbide (B4C) and plain SiC drops when the ceramics are impacted by projectiles at angles lower than 90° to the surface of ceramic. This performance drop is caused by the extensive fracture and consequential loss in shear properties of the more brittle ceramics. The higher toughness of the AlN eliminates this performance drop. The solid solution matrix in TYPES 2 and 3 of the proposed ceramic composite exhibit a toughness between that of AlN and SiC. The unreacted particles which remain in the matrix impart additional toughness in the composite by the crack deflection mechanisms common in other particulate ceramic composite materials. The same crack deflection mechanisms give the TYPE 1 microstructure greater toughness than that of plain SiC as well. The proposed ceramic composite will have: sufficiently high ballistic performance to perform as lightweight armor systems; toughness such that the problems with limited multi-hit performance are substantially reduced or eliminated; and costs low enough to justify use in armor applications.

The ballistic performance, multi-hit performance, and cost requirements of an armor system guides the selection of the appropriate ceramic composite formulation and microstructural type. For instance, for the lowest possible costs a high percentage of AlN composite would be processed to form a TYPE 1 microstructure. Higher ballistic performance requirements would require the formulation to have higher SiC contents with a TYPE 2 or 3 microstructure. TYPE 3 formulation would be used for greater toughness and multi-hit performance. When used as armor, the ceramic composite of the present invention is preferably formed from aluminum nitride with 1 to 99 percent silicon carbide. The aluminum nitride and silicon carbide are received as 0.5 to 5 micron powders which are placed in molds and are either hot pressed together or sinter fired together at about 2000 psi for 4 to 6 hours at about 1700° C. The aluminum nitride and silicon carbide form a solid solution which when cooled are in the shape of hard tiles which are connected to the vehicle surface to be protected.

The aluminum nitride has about two-thirds the efficiency of silicon carbide to stop the armor piercing projectiles as compared to silicon carbide alone. However, the aluminum nitride, at the present time, costs about one-third that of silicon carbide. The silicon carbide when hot pressed with aluminum nitride improves the efficiency of the armor by increasing the projectile erosion properties of the composite.

Although the primary intended use of the ceramic composite of the present invention is as armor for military vehicles which will defeat armor piercing munitions, it will be understood that the composite may be used for cutting tools, wear parts, nozzles, electronic components, high temperature components and many other applications subjected to high impact forces and/or wear.

From the foregoing description it is apparent that the ceramic composite of the present invention is formed from a selected percentage of the silicon carbide and aluminum nitride which react when processed to form the ceramic composite. The solid solution microstructure is formed by processing at a higher temperature compared to the mixed individual AlN and SiC phase microstructure.

Although the best mode contemplated for carrying out the present invention has been herein shown and described, it will be apparent that modification and variation may be made without departing from what is regarded to be the subject matter of the invention.

What is claimed is:

1. A method of forming a ceramic composite from silicon carbine and aluminum nitride for use as armor when at least partially formed into a solid solution, comprising the steps of:
   mixing silicon carbide with aluminum nitride when in powdered form; and
   heating and pressing the powders together at about 2000 psi when being subjected to a temperature of between 1600°–1800° C. for four to six hours for forming a solid solution ceramic composite armor having high multi-hit capacity.

2. A method according to claim 1 wherein said powders are preferably pressed together for about four to six hours while maintained at about 1700° C.

3. A method according to claim 1 wherein both powders are in said powdered form and are about 0.5 to 5 micron powders.

4. A method according to claim 1 wherein the percentage of silicon carbide powders in aluminum nitride is between 1 to 99 percent.

5. A method according to claim 1 wherein both powders are about 0.5 to 5 micron powders, and wherein said powders are pressed together for about four to six hours while maintained at about 1700° C. to form said solid solution ceramic composite.

6. A method according to claim 5 wherein the percentage of silicon carbide powders in aluminum nitride is between 1 to 99 percent.

7. A method according to claim 1 wherein the percentage of silicon carbide in aluminum nitride is preferably between about 75–95%.

8. A method of forming a ceramic composite armor from silicon carbide and aluminum nitride powders after being formed into a solid solution, comprising the steps of:
   mixing silicon carbide with aluminum nitride when in powder form and when the powders are 0.5 to 5 micron powders; and
   sintering said mixing powders at a temperature between 1800°–2300° C. and at a pressure of about 2000 psi for coherently bonding said silicon carbide and aluminum nitride powders together in a solid ceramic composite armor having high multi-hit capacity after cooling.

9. A method of forming a ceramic composite from silicon carbide and aluminum nitride powders for use as tough high temperature components when at least partially formed into a solid solution, comprising the steps of:
   mixing silicon carbide with aluminum nitride when in powdered form; and
   heating and pressing the powders together at about 2000 psi when being subjected to a temperature of between 1600°–1800° C. for four to six hours for forming a solid solution ceramic composite component capable of withstanding high temperatures.

10. A method according to claim 8 wherein the percentage of silicon carbide powder in aluminum nitride powder is between about 1–99 percent.

11. A method of forming ceramic composite used as tough high temperature components from silicon carbide and aluminum nitride powders after being formed into a solid solution, comprising the steps of:
   mixing silicon carbide with aluminum nitride when in powdered form and where the powders are 0.5 to 5 micron powders; and
   sintering said mixed powders at a temperature between 1800°–2300° C. and a pressure of about 2000 psi for coherently bonding said silicon carbide and aluminum nitride powders together in a solid ceramic component capable of withstanding high temperatures.

12. A method according to claim 8 wherein the percentage of silicon carbide powders in aluminum nitride powders is preferably between about 75–95 percent.

13. A hard solid solution ceramic composite component as an article of manufacture, comprising:
   a mixture of silicon carbide powders and aluminum powders hot pressed together at about 2000 psi, said powders when in their powdered form being hot pressed having a size of between 0.5–5 microns and after being hot pressed and cooled said composite component having high toughness and being capable of withstanding high temperatures.

14. An article of manufacture according to claim 13 wherein the percentage of silicon carbide powder in aluminum nitride powders is between 75–95 percent.

* * * * *